No. 727,693. Patented May 12, 1903.

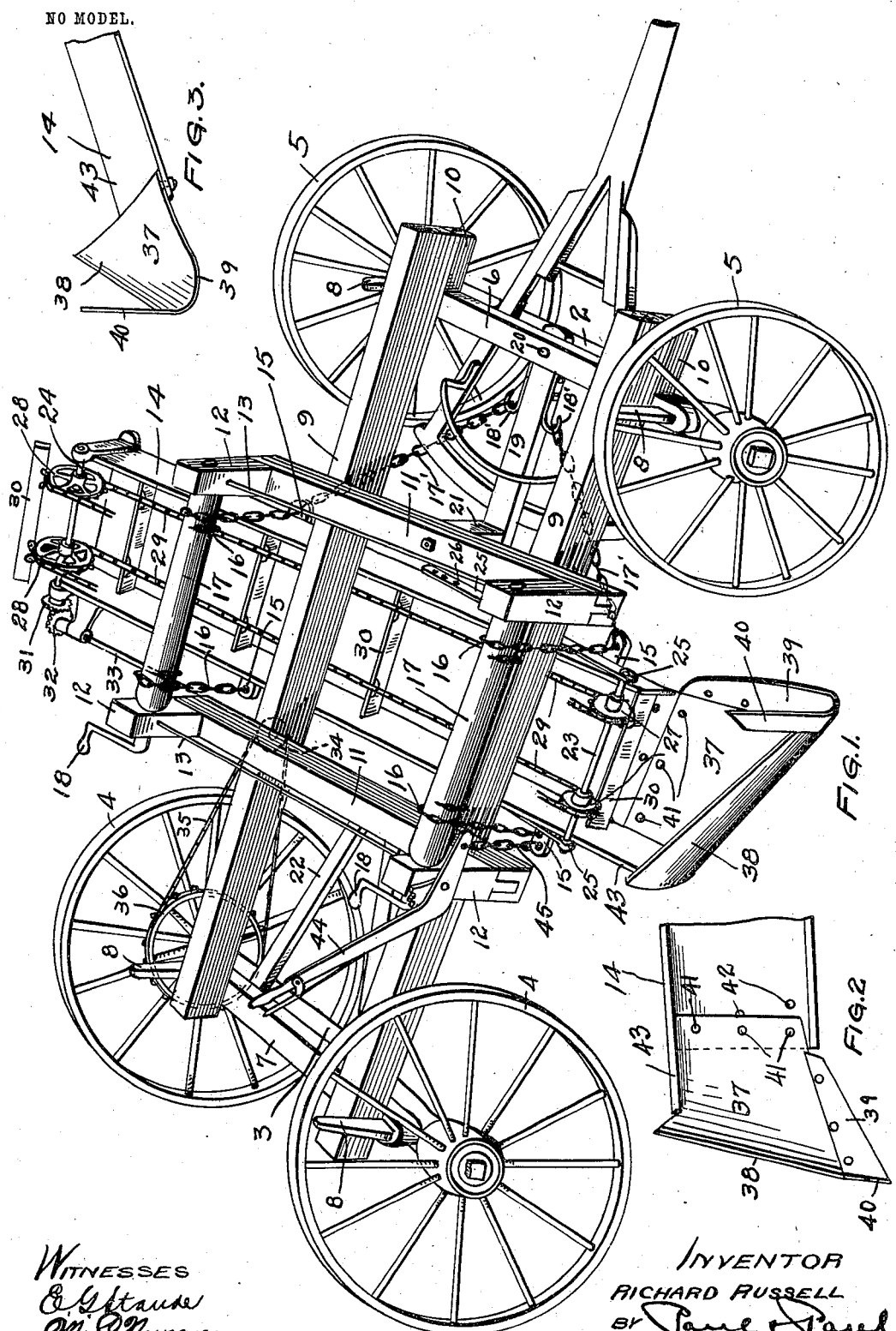

UNITED STATES PATENT OFFICE.

RICHARD RUSSELL, OF STEPHEN, MINNESOTA.

ROAD-GRADING AND DITCHING MACHINE.

SPECIFICATION forming part of Letters Patent No. 727,693, dated May 12, 1903.

Application filed February 6, 1902. Serial No. 92,766. (No model.)

*To all whom it may concern:*

Be it known that I, RICHARD RUSSELL, of Stephen, Marshall county, Minnesota, have invented certain new and useful Improvements in Road-Grading and Ditching Machines, of which the following is a specification.

The object of my invention is to provide a machine of more simple construction than those heretofore employed for grading and ditching, to the end that the apparatus can be manufactured and sold for a much lower price than machines of this kind now in general use.

A further object is to provide a machine that is adapted to gather up mud and water, as well as gravel, and deposit the same at any desired point on the road-bed.

The invention consists generally in providing a wheeled frame with a transversely arranged and operating conveyer and a scoop arranged in connection with said conveyer and adapted to gather up the gravel and mud and water and direct it into said conveyer.

Further, the invention consists in providing means for adjusting said scoop on the receiving end of said conveyer Further, the invention consists in various constructions and combinations, all as hereinafter described, and particularly pointed out in the claims.

In the accompanying drawings, forming part of this specification, Figure 1 is a perspective of a machine embodying my invention. Fig. 2 is a plan view of the receiving end of the conveyer, showing the means for adjusting and supporting the scoop thereon. Fig. 3 is a rear view of the scoop, showing the cutting edge thereof.

In the drawings, 2 and 3 represent, respectively, the forward and rear axles, provided with suitable wheels 4 and 5, whereon the ditching and grading apparatus is supported. Upon these axles I provide rockers 6 and 7, provided with stakes 8 and connected by timbers 9, which rest upon the rocker 7 at their rear ends and are provided with the blocks 10 at their forward ends, which engage the rocker 6 and prevent backward movement of said timbers. Upon the timbers 9 I provide cross-timbers 11, which project beyond the timbers 9 and are provided with posts 12, connected by rods 13. Beneath the timbers 9 is a shallow transversely-arranged box 14, open at the ends and substantially water-tight. Beneath this box, near each end, are cross-bars 15, that are connected by chains 16 with windlasses 17, mounted in the posts 12 and provided with suitable cranks 18, by means of which the chains may be wound or unwound on the drums of the windlasses and the box raised or lowered. Suitable ratchet devices (not shown) are provided in connection with each windlass, so that the box can be locked at any desired elevation from the ground.

In use the receiving end of the box will be nearer the ground than the opposite end to facilitate gathering up the gravel and mud or water from the ditch. The bars 15 are connected at their forward ends by draft-chains 17' with hooks 18', provided on a stub-reach 19, through the forward end of which the king-bolt 20 passes. A block 21 is provided between the rear end of the reach 19 and the timber 11, above and to which said timber is secured. The rear axle is also provided with a reach 22, that extends forward and is secured in any suitable manner to the rear timber 11. The conveyer-box and the cross-timbers are thus securely fastened to the running-gear of the machine and will be held rigidly, even though subjected to a heavy strain. Near each end of the conveyer-box I provide shafts 23 and 24, the former being mounted in bars 25, that extend toward the middle of said box and are pivoted thereon to permit the shaft 23 to automatically adjust itself to the volume of earth or turf that may be passing in at the receiving end of the conveyer-box. I prefer to provide a series of pivot-holes 26 in the bars 25, so that the pivotal point of said bars may be changed at will. The shafts 23 and 24 are provided with sprockets 27 and 28, respectively, and these are connected by belts 29, between which slats or blades 30 are arranged. These blades are adapted to sweep over the bottom of the conveyer-box and gather up and carry along the gravel, mud, or water that may be therein. The shaft 24 is provided with a pinion 31, meshing with a similar pinion 32 on a shaft 33. The shaft 33 is provided with a sprocket 34, connected by a belt 35 with a sprocket 36 on one of the rear wheels. At the receiving end of the conveyer-box I provide a scoop device 37, that is provided with a curved wing 38, corresponding substantially to a moldboard, and a cutting point or blade 39, that is removably secured to the scoop and is provided with a vertical knife 40, that is adapted to cut the turf, roots, or other obstruction in front of the moldboard. The scoop 37 is provided with a series of holes 41, adapted to receive the ordinary plow-bolts, which pass through corresponding holes in the receiving end of the conveyer. I also provide holes 42 in the bottom of said conveyer, that are adapted to receive said bolts and permit the cut of the scoop or the distance it projects beyond the end of the conveyer to be regulated. The curved wall 38 of the scoop swings inwardly at the rear side thereof and meets an extension 43 on the rear wall of the conveyer-box and forms a close joint therewith, and the opposite side of said scoop forms a close joint with the floor of the conveyer-box, so that when mud or water is gathered up by the scoop it cannot escape, but will be swept by the blades 30 up over the close floor of the box to its discharge end. It is sometimes desirable to elevate or depress the nose of the scoop, and I therefore provide a hand-lever 44 on one of the posts 12 near said scoop and connect said lever by a chain 45 with the bar 15. This lever has the usual latch device for locking it in any desired position, and by means of the same I am able to tilt the conveyer-box and depress the nose of the scoop, so that it will dig deeper into the ditch or other place that it may be working.

In operation the conveyer-box having been adjusted the proper distance from the ground, the operator will start the machine, and the scoop digging into the ditch will gather up the sand or gravel, or if used in wet soil or weather the mud and water, and direct it into the receiving end of the conveyer-box, where the sweeper or blades will gather up the material and discharge it onto the road-bed at the opposite side of the machine.

The advantages of this machine lie in its extreme simplicity, ease and convenience of operation, and comparative inexpensive construction and cost of operation. It can be used in wet as well as dry soil, and hence possesses great advantages over all other machines heretofore used for this purpose.

I claim as my invention—

1. The combination, with a wheeled frame, of a transverse conveyer-box suspended beneath the same and having a substantially water-tight bottom, conveyer-blades operating over the floor of said box to sweep the material to the discharge end thereof, a scoop provided on the receiving end of said box and forming a substantially water-tight joint therewith, and means for adjusting the receiving side of said scoop toward or from said box, for the purpose specified.

2. The combination, with a wheeled frame, of a transverse conveyer-box suspended beneath the same and having a substantially water-tight bottom, a conveyer-belt provided with a series of sweeper-blades adapted to travel over said floor and carry the material thereon to the discharge end of said box, a scoop secured to the receiving end of said conveyer and forming a substantially water-tight joint therewith, said scoop having a cutting edge at its forward end and a curved plate or moldboard provided on said scoop in the rear of said cutting edge and forming a close joint with the rear wall of said box, substantially as described.

In witness whereof I have hereunto set my hand this 25th day of January, 1902.

RICHARD RUSSELL.

In presence of—
RICHARD PAUL,
M. C. NOONAN.